UNITED STATES PATENT OFFICE.

JAMES W. GILLIES, OF NEW YORK, N. Y.

IMPROVEMENT IN PROCESSES OF TREATING COFFEE.

Specification forming part of Letters Patent No. 116,299, dated June 27, 1871.

*To all whom it may concern:*

Be it known that I, JAMES W. GILLIES, of the city, county, and State of New York, have invented a new and useful Improvement in the Treatment of Coffee for the purpose of removing the skin from and drying the berry; and I do hereby declare that the following is a full, clear, and exact description of the same:

The object of this invention is twofold, viz.: First, to remove, before roasting, the thin skin with which the coffee berry is wholly or partially enveloped, and which, when roasted with the coffee, impairs its flavor; and, second, to reduce the liability of the berry to become moldy from the effect of moisture in the atmosphere. The invention consists in subjecting the berry to such a degree of heat as will, without roasting, effect the desired results.

The process may be performed in an ordinary coffee-roasting cylinder over a slow fire, or in any other apparatus that will enable the heating to be performed without danger of scorching. The exposure to the heat must be only of such duration as will be sufficient to begin to effect a change in the color of the berry to a brownish tint. This will generally be about five minutes, when performed in an ordinary roasting apparatus. The berry in coming to this state is slightly plumped and made to throw off the particles of skin which had previously adhered to it; and as soon as this occurs it is removed from the apparatus and screened or winnowed to get rid of the skin.

The coffee thus treated may be kept for any length of time before roasting, and may be sold as raw coffee.

What I claim as my invention, and desire to secure by Letters Patent, is—

The within-described process of treating coffee before roasting, by subjecting it to the action of the heat.

JAS. W. GILLIES.

Witnesses:
H. D. ROBINSON,
STEPHEN B. BROGEN.